Jan. 9, 1962   J. V. LANDRY   3,016,258
MEANS FOR RELEASABLY MOUNTING A STORE ON AN AIRCRAFT
Original Filed Sept. 28, 1955   2 Sheets-Sheet 1
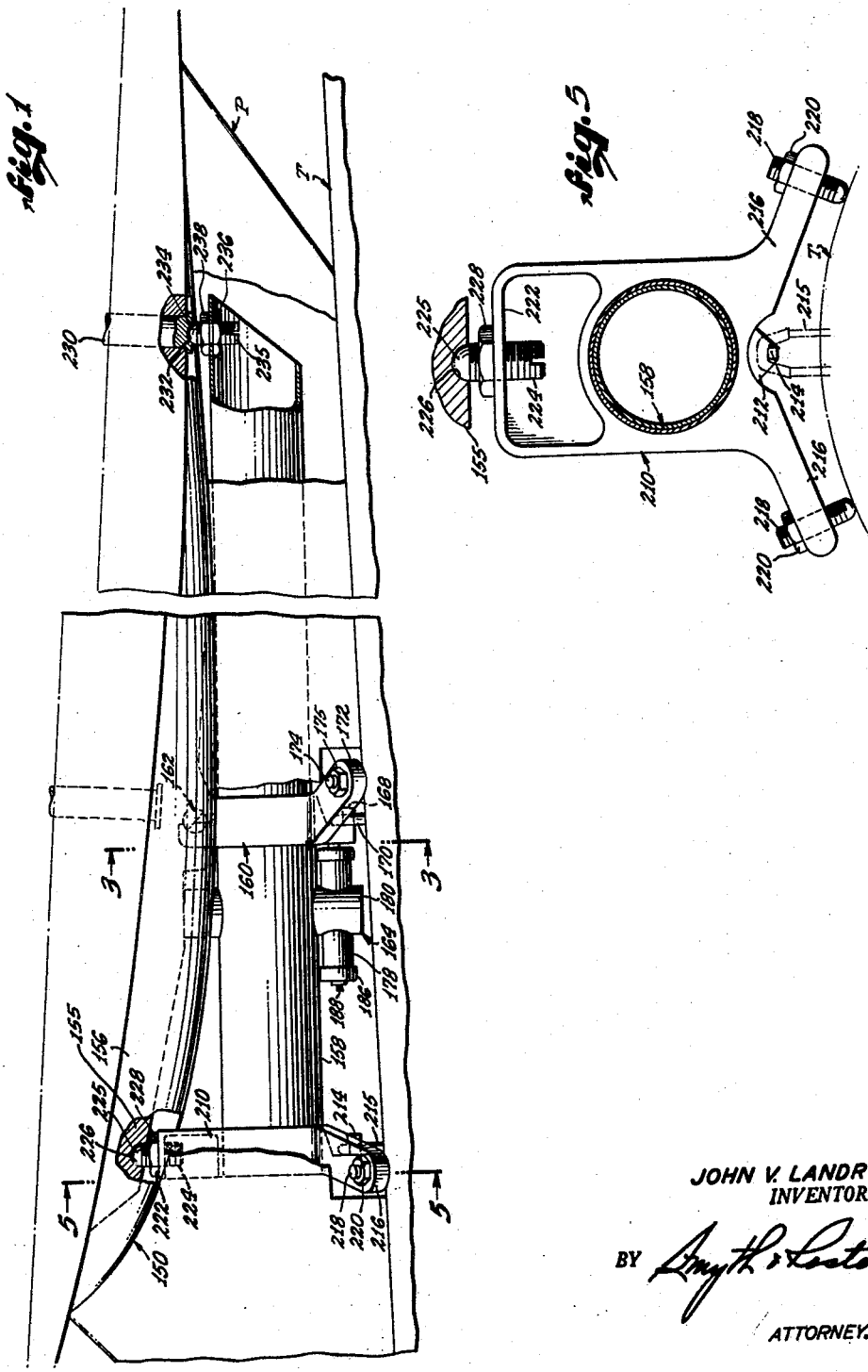
JOHN V. LANDRY,
INVENTOR.
BY
ATTORNEYS

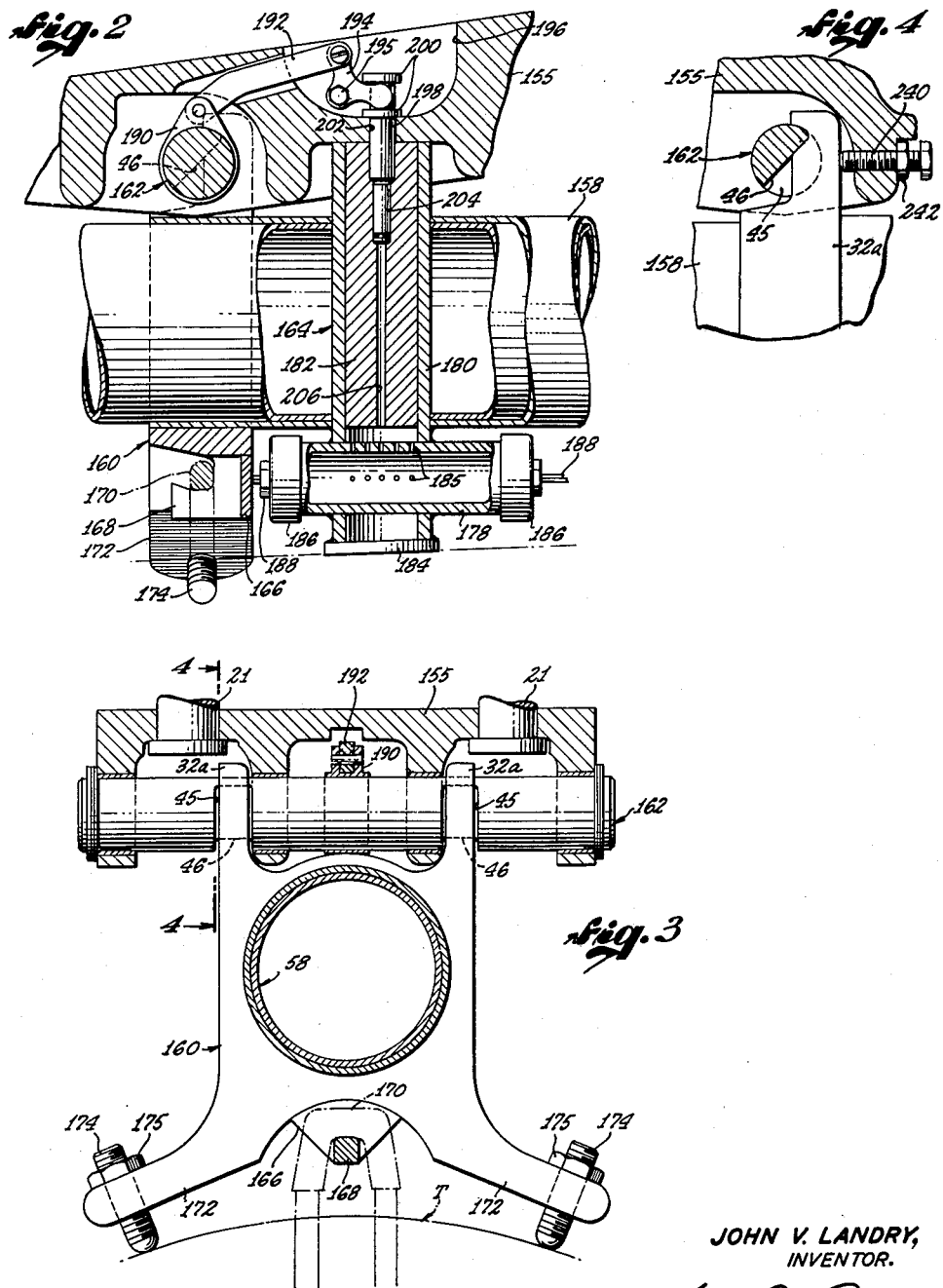

United States Patent Office

3,016,258
Patented Jan. 9, 1962

3,016,258
MEANS FOR RELEASABLY MOUNTING A STORE ON AN AIRCRAFT
John V. Landry, Manhattan Beach, Calif., assignor to Pastushin Aviation Corporation, Los Angeles, Calif., a corporation of California
Original application Sept. 28, 1955, Ser. No. 537,090, now Patent No. 2,948,563, dated Aug. 9, 1960. Divided and this application Sept. 18, 1959, Ser. No. 841,432
11 Claims. (Cl. 294—83)

This invention relates to means for mounting a jettisonable store, such as an auxiliary fuel tank, on an airborne vehicle or aircraft in a releasable manner and for applying force to the released store to thrust the store away from the aircraft. The present application is a division of my copending application, Serial No. 537,090, filed September 28, 1955, entitled, "Means For Releasably Mounting a Store on an Aircraft," no issued as Patent 2,948,563.

Broadly described, the means for releasably holding the store comprises a suspension member unitary with the store in combination with a rotary engagement member inside the aircraft for releasable engagement with the suspension member. The rotary engagement member is preferably in the form of a rotary shaft that is partially in the path of withdrawal of the suspension member, this shaft having a peripheral recess to clear the path of withdrawal at a release position of rotation of the shaft. Thus with the shaft engaging the suspension member to support the store, rotation of the shaft to its release position clears the path of withdrawal of the suspension member to release the store.

The present invention has special utility for use on an aircraft where it is not practical to employ more than one ejector. A single engagement means is employed with the single ejector, this engagement means being responsive to operation of the ejector. The engagement means provides a two-point support with the two points spaced apart laterally with respect to the direction of flight. The store makes pivotal contact with the aircraft at a point spaced forward from the two-point engagement means and makes similar pivotal contact with the aircraft at a point spaced aft from the two-point engagement means. Each pivotal contact is made by a spherically curved pivot member removably seating in a socket. The engagement means makes the two pivotal contacts effective by drawing the store bodily towards the aircraft. When the store is ejected, it tends to rotate momentarily about its aft pivotal contact with the aircraft but is immediately thrown bodily away from the aircraft.

The various features and advantages of the invention will be apparent from the following detailed description taken with the accompanying drawings.

In the drawings, which are to be regarded as merely illustrative:

FIG. 1 is a side elevational view of the selected embodiment of the invention in which a single engagement means is used in combination with a single ejector.

FIG. 2 is a fragmentary view partly in side elevation and partly in section showing a portion of this embodiment of the invention;

FIG. 3 is a transverse sectional view taken as indicated by the line 3—3 of FIG. 1 showing the construction of the engagement means and the cooperating suspension means;

FIG. 4 is a fragmentary section taken along the line 4—4 of FIG. 3; and

FIG. 5 is a transverse sectional view taken as indicated by the line 5—5 of FIG. 1 showing a forward stabilizing casting incorporated in the pylon.

In the present embodiment of the invention shown in the drawings, an auxiliary fuel tank T is mounted on the underside of an aircraft wing W by means of a pylon P in cooperation with an adapter that is generally designated by the numeral 150. The adapter 150 may comprise a forward casting 155 that is normally concealed by a sheet metal fairing 156 attached thereto.

The pylon P which is jettisoned with the auxiliary tank T includes a cylindrical beam 158, which in this instance is made of two thicknesses. The cylindrical beam carries a single hanger or suspension means 160 for attaching the fuel tank and pylon to the adapter 150. The adapter 150 incorporates a releasable engagement means in the form of a shaft 162 which engages the suspension means 160 and the pylon incorporates an ejector gun 164 for use in jettisoning the fuel tank.

As shown in FIG. 2, the hanger 160 has a central downward extending ear 166 provided with a short hook 168 to serve as a support bracket for engagement with a shackle fitting 170 of the auxiliary fuel tank, the shackle fitting being looped over the bar 168 as shown in FIG. 3. The hanger 160 is also formed with a lower pair of laterally extending stabilizer arms 172 in which are mounted adjustable stabilizer elements in the form of stay-bolts 174. The two stay-bolts may be tightened against the tank T and secured in adjusted position by lock nuts 175 to preload the shackle fitting 170 and to make the tank rigid relative to the pylon frame.

The shaft 162 is cut away at spaced points to provide a pair of semi-circular peripheral recesses 45 and corresponding adjacent semi-circular engagement portions or elements 46 for releasable engagement with a corresponding pair of suspension arms 32a of the hanger 160. The shaft 162 is journalled in the adapter casting 155 which is attached to the aircraft in a permanent manner by a pair of special bolts 21 (FIG. 3).

In the present embodiment of the invention, the ejector gun 164 has a breech 178 at the lower end thereof and this breech is permanently united with the ejector gun to be discarded with the gun. The ejector gun 164 has a barrel 180 that extends through the cylindrical beam 158 in abutment against the casting 155. The upper end of the barrel 180 is open so that a piston 182 in the barrel may also abut the casting 155. The lower end of the barrel 180 adjacent the auxiliary fuel tank T is closed by an end wall 184.

The breech 178 is in the form of a tube that extends through the gun barrel 180 transversely thereof. This tube forms a combustion chamber and has numerous small perforations 185 for communication with the interior of the gun barrel 180. The opposite ends of the breech tube 178 are adapted to receive the usual explosive ejection cartridges (not shown) and for this purpose the two ends are closed by removable caps 186 that are provided with electrically actuated detonating devices 188.

The engagement means or shaft 162 may be made responsive to the ejector gun in any suitable manner. In the construction shown, the shaft 162 is provided with an actuating arm 190 which is connected by a link 192 with one arm of a small bell crank 194. The bell crank 194 is mounted on a pivot bolt 195 in a recess 196 in the adapter casting 155. The other arm of the bell crank is forked to engage the upper end of a release plunger 198 between a pair of radial flanges 200 of the plunger. This release plunger 198 is slidingly mounted in a bore 202 in the adapter casting 155 and normally extends into the upper end of the piston 182 in abutment against a second smaller plunger 204. The smaller plunger 204, which is provided with an O-ring, is slidingly mounted in an axial bore 206 in the piston 182, this bore being enlarged to house the smaller plunger 204 and being again enlarged to receive the lower end of the release plunger 198.

The forward end of the pylon P includes a stabilizer casting 210 that is carried by and embraces the cylindrical beam 158. As best shown in FIG. 5, the stabilizer casting 210, like the hanger casting 160, has a central downwardly extending ear 212 provided with a short hook 214 to serve as a support bracket for engagement with a shackle fitting 215 of the auxiliary fuel tank, the shackle fitting being looped over the bar 214. The stabilizer casting 210 is also formed with a lower pair of laterally extending stabilizer arms 216 in which are mounted adjustable stabilizer elements in the form of stay-bolts 218. The two stay-bolts may be tightened against the tank T and secured in adjusted position by the usual lock nuts 220 to preload the shackle fitting 215 and make the tank rigid relative to the pylon.

The upper end of the stabilizer casting 210 is formed with a transverse flange 222 through which is threaded an upwardly extending pivot member in the form of a screw 224 having a spherically curved end 225 to seat in a removable manner in a spherically curved socket 226 in the adapter casting 155. This pivot screw 224 is tightened into snug engagement with the socket 226 and is secured in this tightened position by a lock nut 228.

At the aft end of the pylon, a similar pivotal contact is made with the aircraft. In the present embodiment of the invention, a special wing attachment bolt 230 in the wing of the aircraft is used for this purpose. The wing attachment bolt 230 provides a downwardly directed socket 232 to receive in a removable manner the spherical nose 234 of an upwardly extending pivot member in the form of a screw 235. The pivot screw 235 is adjustably mounted in the aft end of the cylindrical beam 158 by an internally threaded fitting 236. The pivot screw 235 is tightened into engagement with the socket 232 and is secured by the usual lock nut 238.

In practicing the invention, the pylon structure may be first attached to the aircraft in the manner shown in FIGS. 2, 3 and 4. The pylon P is first mounted on the aircraft by inserting the two suspension arms 32a of the hanger 160 into the recesses in the adapter casting 155 for engagement by the engagement portions or elements 46 of the shaft 162. To hold the suspension arms 32a in their engaged positions, the usual screws 240 are provided in the adapter casting 155, each screw having a lock nut 242.

At this initial position of the pylon P, the forward pivot screw 224 carried by the pylon registers with the forward spherical socket 226 and the aft pivot screw 235 registers with the aft socket 232. These two screws are then tightened to preload the two suspension arms 32a and to make the pylon P rigid relative to the aircraft.

The preloading or downward pressure on the pylon at the forward and rearward points created by tightening the forward and rearward pivot screws 224 and 235 immobilizes the pylon with respect to rotation in a longitudinal plane about the axis of the transverse shaft 162. At the same time, the tightening of the two screws tightens the engagement of the shaft 162 with the pylon at the two laterally spaced points to immobilize the pylon with respect to lateral movement relative to the aircraft. A feature of the invention is that all of the tightening may be carried out at one of the two screws 224 or 235 to make the pylon rigid relative to the aircraft.

After the pylon P is mounted on the aircraft in this manner, the auxiliary tank T is attached to the pylon structure by means of the shackle fittings 170 and 215. The stay-bolts 174 on the hanger 160 and the stay-bolts 218 on the stabilizer casting 210 are then tightened to preload the shackle fittings and make the auxiliary tank rigid relative to the pylon structure.

When the moment arrives to jettison the fuel tank T the detonation of the explosive charges in the breech 178 creates a pressure rise in the gun barrel 180. This pressure rise is transmitted through the axial bore 206 to the small plunger 204 and forces the small plunger to move upward and drive the release plunger 198 into the casting recess 196. This upward movement of the release plunger 198 rocks the bell crank 194 and thereby rotates the shaft 162 for release of the fuel tank. As soon as the fuel tank is released in this manner, the piston 182 thrusts upward against the casting 155 to cause the released fuel tank to separate from the aircraft.

The thrust by the piston 182 causes the unitary pylon and fuel tank assembly to swing away from the aircraft with the forward pivot screw 224 moving out of the forward socket 226. During this initial outward movement, the pylon and tank assembly tends to pivot momentarily about the point of engagement of the rear pivot screw 235 with the rear socket 232, but the outward bodily movement of the assembly immediately carries the aft pivot screw away from the aft socket. Thus the store comprising the auxiliary fuel tank with the pylon attached thereto is effectively and safely ejected from the aircraft.

My description in specific detail of the selected embodiment of the invention will suggest to those skilled in the art various changes, substitutions and other departures from my disclosure that properly lie within the spirit and scope of the appended claims.

I claim:

1. In an apparatus for mounting a jettisonable store on an aircraft and for releasing the store with ejection force, the combination of: suspension means unitary with said store to extend into the interior of said aircraft for anchorage of the store; engagement means mounted on the aircraft for engagement with said suspension means to support the store, said engagement means and the cooperating suspension means extending laterally of the store to provide laterally spaced support points for the store; first cooperative contact means on the aircraft and the store, respectively, comprising a socket and a pivot members seated therein for pivotal contact of the store near one end thereof with the aircraft; second cooperative contact means comprising a socket and a pivot member seated therein for pivotal contact of the store with the aircraft near the other end thereof, said suspension means being intermediate said first and second means, at least one of said first and second means being adjustable to exert separation force between the aircraft and the store to place said suspension means under stress to make the store rigid relative to the aircraft; ejector means separate from said suspension means and said engagement means to exert ejection force against said store at a point intermediate said first and second means; and means to release said engagement means from said suspension means in timed relation to the operation of said injector means.

2. A combination as set forth in claim 1 in which said suspension means includes two suspension members spaced apart laterally with respect to the direction of flight, said two suspension members being on opposite sides of a line through said first and second means, each of said suspension members having a shoulder directed towards the store; and in which said engagement means includes two corresponding engagement elements for engagement with said shoulders respectively, said engagement elements being operatively interconnected for rotation in unison.

3. A combination as set forth in claim 1 in which said ejector means includes: a piston on said store; means to subject said piston to fluid pressure to thrust the piston against the store; and means responsive to said fluid pressure to release said engagement means.

4. A combination as set forth in claim 3 in which said piston has a longitudinal passage therethrough to transmit actuating fluid pressure to said releasing means.

5. In an apparatus for mounting a jettisonable store on an aircraft and for releasing the store with ejection force, the combination of: suspension means unitary with said store to extend into the interior of said aircraft for anchorage of the store; engagement means mounted on the aircraft for engagement with said suspension means to support the store, said engagement means and the cooperating suspension means extending laterally of the store to provide laterally spaced support points for the store; a first means providing releasable contact of the forward end of the store with the aircraft; a second means comprising a socket and a pivot member seated therein for pivotal contact of the aft end of the store with the aircraft, said suspension means being intermediate said first and second means, at least one of said first and second means being adjustable to place said suspension means under stress to make the store rigid relative to the aircraft; ejector means separate from said suspension means and said engagement means to exert ejection force against said store at a point intermediate said first and second means; and means to release said engagement means from said suspension means in timed relation to the operation of said ejector means.

6. In an apparatus for mounting a jettisonable store on an aircraft and for releasing the store with ejection force, the combination of: two suspension means unitary with said store and spaced apart laterally thereof to extend into the interior of said aircraft for anchorage of the store, each of said suspension means having a shoulder directed towards the store; engagement means mounted in the aircraft adjacent the path of widthdrawal of said suspension means from the aircraft, said engagement means having two portions for engagement with said two shoulders, respectively, each of said portions having a circular configuration of less than a full circle and being rotatable about its axis of curvature between a holding position in engagement with the corresponding shoulder and a release position out of the range of the path of withdrawal of the shoulder thereby to release the store; a first means providing releasable contact of the forward end of the store with the aircraft; a second means providing releasable contact of the aft end of the store with the aircraft, said suspension means being intermediate said first and second means, at least one of said first and second means being adjustable to place said suspension means under stress to make the store rigid relative to the aircraft; ejector means to exert ejection force against said store at a point intermediate said first and second means; and means to release said engagement means from said suspension means in timed relation to the operation of said ejector means.

7. In an apparatus for mounting a jettisonable store on an aircraft and for releasing the store with ejection force, the combination of: releasable engagement means on the aircraft to engage and support the store at two laterally spaced points on opposite sides of the longitudinal axis of the store on a line substantially perpendicular to the direction of the longitudinal axis; a first means forward of said engagement means and a second means rearward of the engagement means to act between the aircraft and the store to create downward pressure on the store at forward and rearward points substantially in alignment with the longitudinal axis of the store whereby said first and second means cooperate with said engagement means to hold the store against rotation relative to the aircraft about a transverse axis at the engagement means and said first and second means tighten the engagement of said engagement means with the store at said two laterally spaced points to hold the store against rotation relative to the aircraft about a longitudinal axis.

8. A combination as set forth in claim 7 which includes ejector means carried by the store to exert ejective force against the aircraft between said first and second means; and which includes means responsive to force created by said ejector means to release said engagement means.

9. A combination as set forth in claim 7 in which said store has two suspension means at said two laterally spaced points respectively, each having a shoulder directed towards the store; and in which said releasable engagement means on the aircraft comprises a transverse means having peripheral recesses at said two laterally spaced points, said transverse means being rotatable between a position engaging said shoulders to support the store and a position with said recesses clearing said shoulders for release of the store.

10. In an apparatus for mounting a jettisonable store on an aircraft and for releasing the store with ejective force wherein means on the aircraft releasably supports the store and means on the store provides fluid pressure for ejective force, the combination therewith of: a piston on the store for abutment against the aircraft to exert ejective force against the aircraft in response to said fluid pressure; means on said aircraft to operate said support means for release of the store; a passage through said piston to transmit fluid pressure therethrough; and means to actuate said operating means in response to the transmitted fluid pressure.

11. A combination as set forth in claim 10 in which said actuating means includes an auxiliary piston in the outer end of said passage, said auxiliary piston being operatively connected to said operating means.

References Cited in the file of this patent

UNITED STATES PATENTS

| | | |
|---|---|---|
| 2,777,655 | Graham | Jan. 15, 1957 |
| 2,865,582 | Price | Dec. 23, 1958 |
| 2,867,396 | Johnson | Jan. 6, 1959 |
| 2,889,746 | Glassman et al. | June 9, 1959 |
| 2,948,563 | Landry | Aug. 9, 1960 |
| 2,955,866 | Firman | Oct. 11, 1960 |